United States Patent [19]

Nasako et al.

[11] Patent Number: 5,409,676
[45] Date of Patent: Apr. 25, 1995

[54] HEAT TRANSFER SYSTEM UTILIZING HYDROGEN ABSORBING METALS

[75] Inventors: Kenji Nasako; Kouichi Satou; Teruhiko Imoto, all of Moriguchi, Japan

[73] Assignee: Sanyo Electric Co., Ltd., Osaka, Japan

[21] Appl. No.: 170,755

[22] Filed: Dec. 21, 1993

[30] Foreign Application Priority Data

Dec. 28, 1992 [JP] Japan .................................. 4-358762

[51] Int. Cl.$^6$ .................. F28D 20/00; F28F 27/02
[52] U.S. Cl. ............................... 422/200; 165/101; 165/104.12
[58] Field of Search ............... 422/198, 200; 165/104.12, 101; 62/4, 46.2, 480, 489; 123/3

[56] References Cited

U.S. PATENT DOCUMENTS

| | | | |
|---|---|---|---|
| 4,055,962 | 11/1977 | Terry | 165/104.12 X |
| 4,178,987 | 12/1979 | Bowman et al. | 165/104.12 X |
| 5,174,367 | 12/1992 | Nasako et al. | 165/104.12 |

FOREIGN PATENT DOCUMENTS

| | | |
|---|---|---|
| 61-19493 | 9/1981 | Japan . |
| 2242054 | 9/1990 | Japan . |
| 2242055 | 9/1990 | Japan . |
| 2242056 | 9/1990 | Japan . |
| 3-16596 | 3/1991 | Japan . |

OTHER PUBLICATIONS

Nasako, Kenji; Yonesaki, Takahiro; Yonezu, Ikuo; Fujitani, Shin; Satio, Toshihiko; Moroto, Masakazu; Osumi, Masato; Furukawa, Nobuhiro, *Heat Transportation System Using Metal Hydrides*, Proceedings of the 1989 Congress of the International Solar Energy Society, 1990; pp. 1343–1347.

*Primary Examiner*—Robert J. Warden
*Assistant Examiner*—Robert Carpenter
*Attorney, Agent, or Firm*—Armstrong, Westerman, Hattori, McLeland & Naughton

[57] ABSTRACT

A heat transfer system comprising a hydrogen supply unit 1, which transfers hydrogen from a hydrogen recovery tube 8 to a hydrogen supply tube 7, and a multiplicity of hydrogen utilization units 2A and 2B which utilize hydrogen supplied from the hydrogen supply tube 7 via its branching tubes 7a and 7b, respectively, and return hydrogen to the hydrogen recovery tube 8 via associated branching tubes 8a and 8b. By the use of the hydrogen supply tube 7 and the hydrogen recovery tube 8 having large volumetric capacities and filled with hydrogen, the hydrogen supply unit 1 and the hydrogen utilization units 2A and 2B may operate independently, without being synchronized one other.

14 Claims, 2 Drawing Sheets

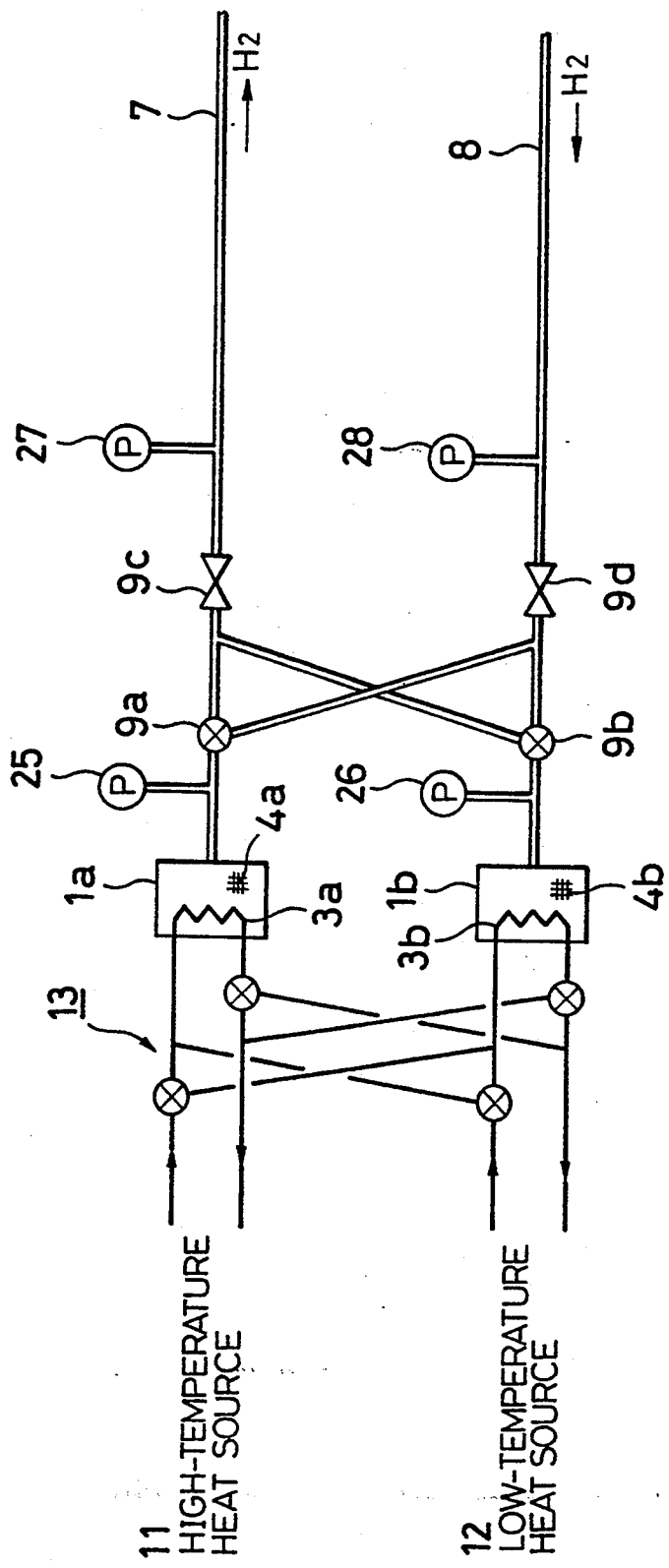

HEAT TRANSFER SYSTEM UTILIZING HYDROGEN ABSORBING METALS

FIELD OF THE INVENTION

The invention relates to a heat transfer system suitable for providing positive and negative heat sources at different sites by transporting hydrogen gas from a hydrogen supply unit to hydrogen utilization units at the sites.

KNOWN ART

Recent goals in the development of new energy sources includes utilization of hydrogen because of its abundance and 'clean' or non-polluting nature to the environment. Along with solar energy, hydrogen can be a promising future source of energy that may substitute for petroleum and fuel gas now in use. Hydrogen may be used as a source of heat for heating and cooling units at different sites. Such hydrogen may be supplied to the systems just like a fuel gas by a delivery piping system.

Japanese Early Publication 62-98196 discloses a heat transfer system including a multiplicity of hydrogen utilization units which may operate simultaneously as a cooling system at one site and as a heating system at another site by provision of hydrogen through hydrogen transport tubes. However, this system is undesirably involved on account of complex synchronous operations of valves provided at various sections in the system for switching and controlling the flow of hydrogen and heat transport media in the system. This is serious if the number of such units is increased.

It is thus desirable to provide a system which is simple in structure and yet may simultaneously provide positive heat when it is operating as a heating system and provide negative heat when operating as a cooling system.

It is an object of the invention to provide a simple heat transfer system for simultaneously providing positive heat to a hydrogen utilization unit at one site and negative heat to a hydrogen utilization unit at another site by exchanging hydrogen between a hydrogen supply unit and the hydrogen utilization units.

SUMMARY OF THE INVENTION

The above object may be carried out by a heat transfer system according to the present invention. The heat transfer system of the invention comprises at least one hydrogen supply unit for supplying hydrogen, first and second hydrogen transport tubes which have large capacities for accommodating hydrogen and are connected to the hydrogen supply unit, and a multiplicity of hydrogen utilization units which are connected to the hydrogen transport tubes and may independently utilize the hydrogen supplied from the tubes in providing positive heat to heating loads (e.g. heaters) and negative heat to cooling loads (e.g. refrigerators).

The hydrogen supply unit comprises:
first and second hydrogen absorbing metal containers containing therein first and second hydrogen absorbing metals, respectively, and first and second heat exchangers, respectively;
a first multiplicity of switching valves for selectively connecting the first and the second containers to the first and second hydrogen transport tubes in accordance with the pressure difference between the pressure in the first and/or the second containers and the pressure in the first and/or the second hydrogen transport tubes;
a first set of control valves for controlling the flow of hydrogen between the first and the second containers and the first and the second hydrogen transport tubes in accordance with the pressure difference;
heat transport paths for connecting the first and the second heat exchangers in the respective containers to a source of heat and a heat radiator; and
a second multiplicity of switching valves for switching said heat transport paths in accordance with the conditions of the first set of the control valves.

The hydrogen utilization unit comprises:
third and fourth containers for accommodating a third and fourth hydrogen absorbing metals, respectively, and third and fourth heat exchangers, respectively;
a third multiplicity of switching valves for selectively connecting the third and the fourth containers to the first and the second hydrogen transport tubes in accordance with the temperature difference between the temperature in the third and/or the fourth containers and the temperature in the first and/or the second hydrogen transport tubes;
heat transport paths for connecting the third and fourth heat exchangers in the third and fourth containers to a heating load and a source of disposed heat in the case where the hydrogen utilization unit is in use to provide positive heat, and connected to a cooling load and a heat radiator in the case where the unit is in use to provide negative heat,
a fourth multiplicity of switching valves for switching said heat transport paths in accordance with the temperature difference between the temperature in the third and/or the fourth heat exchangers and the temperature of the heating/cooling load;
a second set of control valves for controlling the flow of hydrogen between the third and the fourth containers and the first and the second hydrogen transport tubes in accordance with the heat requirement of the loads.

With this construction, the hydrogen utilization units are provided with hydrogen from the hydrogen transport tubes without being influenced by the pressure drop in the hydrogen supply unit since the first and the second hydrogen transport tubes have large capacities, so that the hydrogen supply unit only need to supply the hydrogen transport tube with hydrogen required to compensate pressure drop in the tube. That is, no synchronization is necessary between the hydrogen supply unit and the hydrogen utilization units, which in turn implies that the control unit for the heat transfer system may be simplified even when multiple hydrogen utilization units are included in the system.

An alternative to such hydrogen transport tubes having large capacities is to provide first and second tanks which may maintain substantially constant predetermined pressures therein, thereby providing the hydrogen utilization units with hydrogen in a stable condition.

The first hydrogen transport tube may be used solely for supplying higher pressure hydrogen, while using the second tube for supplying lower pressure hydrogen, hence the first and the second tube will be often referred to as hydrogen supply tube and hydrogen recovery tube, respectively.

The first multiplicity of switching valves may be set to connect one of the containers to the hydrogen supply tube and the other container to the second tube provided that at least the pressure in said one container is higher than the high pressure in the hydrogen supply tube or lower than the low pressure in the second tube.

The first set of control valves between the first and the second containers and the first and the second tubes may be opened provided that the pressure in at least one of the containers is higher than the pressure in the hydrogen supply tube by a predetermined amount, and closed when the pressure difference between them becomes smaller than the predetermined amount.

Thus, undesirable backward flow of hydrogen from the hydrogen supply tube to the container and from the container to the second tube may be prevented.

The third multiplicity of switching valves are set to switch one container, which is connected to the hydrogen supply tube, from the hydrogen supply tube to the second tube at the time the temperature of the heat exchanger in the container has lowered to a predetermined high temperature level if the hydrogen utilization unit is in use for a heating load, and from the second tube to the hydrogen supply tube when the temperature of the heat exchanger has risen above a second predetermined low temperature level if the unit is in use for a cooling load.

The fourth multiplicity of switching valves are set to connect one heat exchanger in one of the containers to the heating load and the other heat exchanger to the disposed heat source after the temperature of the heat exchanger has risen above the predetermined high temperature level when the hydrogen utilization unit is in use for a heating load, and, when the unit is in use for a cooling load, set to connect one heat exchanger in one of the containers to the cooling load and the other heat exchanger to the heat radiator after the temperature of said other heat exchanger has lowered below the second predetermined low temperature level.

The second set of control valves may be opened, connecting the first and the second containers to the first and the second tubes when the hydrogen utilization unit is required to provide positive heat to a heating load, and closed when the heat is not needed any more by the load.

Thus, each of the hydrogen utilization units may be operated independently by means of these hydrogen transport mechanisms.

The invention may be constructed in an alternative way in which, instead of switching heat transport paths based on the temperatures of the heat exchangers, the heat transport paths may be switched base on the pressure differences between the pressures in the containers and the pressures in the tubes. In this case, a hydrogen utilization unit employs pressure gauges provided between the second set of control valves and the third multiplicity of switching valves, one for each hydrogen transport tube, and comprises:

a third and a fourth containers for accommodating a third and a fourth hydrogen absorbing metals, respectively, and a third and a fourth heat exchangers, respectively;

a third multiplicity of switching valves for selectively connecting the third and the fourth containers to the first and the second hydrogen transport tubes in accordance with the pressure difference between the pressure in the third and/or the fourth containers and the pressure in the first and/or the second hydrogen transport tube(s);

heat transport paths for connecting the third and the fourth heat exchangers in the respective containers to a heating load and a source of disposed heat in the case where the hydrogen utilization unit is in use to provide positive heat, and to a cooling load and a heat radiator in the case where the unit is in use to provide negative heat;

a fourth multiplicity of switching valves for switching the heat transport paths from one mode to another in accordance with the conditions of the third multiple switching valves; and a second set of control valves for controlling the flow of hydrogen between the third and the fourth containers and the first and the second hydrogen transport tubes in accordance with the heat requirement of the loads.

It should be apparent in this example also that no synchronization is required between the hydrogen supply unit and the hydrogen utilization units, thereby rendering the heat transfer system simple in structure in independently providing either positive or negative heat, or both.

In the example described above, the control valves 10c and 10d are controlled to regulate the flow rate of hydrogen into the third container and from the fourth container such that the absorption and liberation of heat by the metals in the respective containers due to liberation and absorption of hydrogen meet heat requirements of the heating load or the cooling load. In operation, one of the third and fourth containers connected to the hydrogen supply tube is switched from the hydrogen supply tube to the hydrogen recovery tube as the hydrogen pressure in that container approaches the pressure in the hydrogen supply tube. A short period after this switching of the third multiple valves, the fourth multiple switching valves are set to establish a heat transport path connecting one of the heat exchangers (connected to the hydrogen supply tube) to the disposed heat source and the other exchanger to a heating-load (in the case of a utilization unit providing heat to a heating load), or connecting said one heat exchanger to a heat radiator and the other heat exchanger to a cooling load (in the case of hydrogen utilization unit providing negative heat to a cooling load). The second set of multiple control valves may be opened to connect the third and the fourth containers to the first and the second hydrogen transport tubes when the hydrogen utilization unit is required to provide either positive or negative heat to a load, and closed when the work is done.

Thus, each of the hydrogen utilization units may be operated independently based on pressure control in transporting hydrogen and heat in different modes.

BRIEF DESCRIPTION OF THE DRAWINGS

FIG. 2 shows tube connections for a hydrogen supply unit shown in FIG. 1.

DETAILED DESCRIPTION OF THE PREFERRED EMBODIMENT

Figure 1:
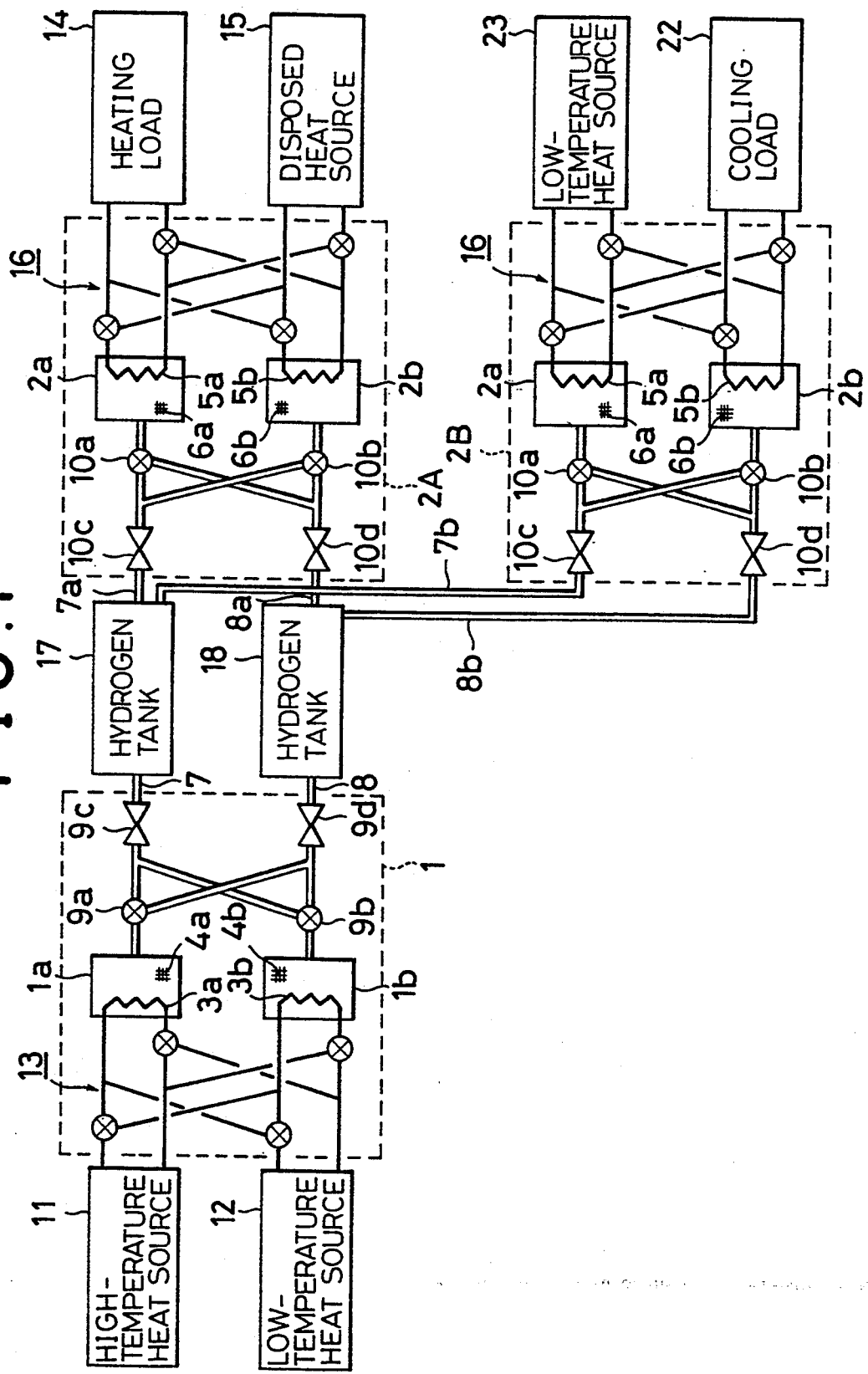
FIG. 1 is a schematic view of a heat transfer system utilizing hydrogen absorbing metals according to the invention.

Referring now to FIG. 1, there is shown a heat transfer system utilizing hydrogen absorbing metals according to the invention. A hydrogen supply unit 1 includes hydrogen absorbing metal containers 1a and 1b for accommodating hydrogen absorbing metals 4a and 4b, respectively. The hydrogen absorbing metal containers 1a and 1b also include therein respective heat exchangers 3a and 3b. Two hydrogen utilization units 2A and 2B also include containers 2a and 2b for accommodating hydrogen absorbing metals 6a and 6b, respectively. The containers 2a and 2b also include therein respective heat exchangers 5a and 5b, respectively.

Provided between the hydrogen supply units 1 and the hydrogen utilization units 2A and 2B are large hydrogen tanks 17 and 18 for storing hydrogen gas at desired pressures. The tank 17 is connected to the hydrogen supply unit 1 by a hydrogen supply tube 7 for supplying hydrogen gas from the hydrogen supply unit 1. The tank 18 is connected to the hydrogen supply unit 1 by a hydrogen recovery tube 8 for recovering hydrogen gas from the tank 18 to the hydrogen supply unit 1. The tank 17 is also connected to the hydrogen utilization units 2A and 2B by another set of hydrogen supply tubes 7a and 7b for delivering hydrogen gas from the tank 17 to the hydrogen utilization units 2A and 2B, which units are also connected to the tank 18 by still another set of hydrogen recovery tubes 8a and 8b for returning hydrogen gas from the hydrogen utilization units 2A and 2B back to the tank 18.

The hydrogen absorbing metal containers 1a and 1b of the hydrogen supply unit 1 are selectively connected to the hydrogen supply tubes 7 and 8 via two three-way switching valves 9a and 9b and control valves 9c and 9d. The heat exchangers 3a and 3b in the respective containers 1a and 1b are selectively connected by heat transport paths to a high-temperature heat source 11 and a low-temperature heat source 12 such as water cooled heat radiator, via a set of four three-way switching valves 13.

Similarly, the hydrogen absorbing metal containers 2a and 2b in the hydrogen utilization units 2A and 2B are selectively connected by heat transport paths to the hydrogen supply tube 7a and the hydrogen recovery tube 8a via two three-way valves 10a and 10b and two control valves 10c and 10d. The heat exchangers 5a and 5b in the respective containers 2a and 2b of the hydrogen utilization unit 2A are thermally connected to a heating load 14 such as a heat radiator for heating a room and a source of disposed heat (hereinafter referred to as disposed heat source) 15 in different modes, via a set of four three-way switching valves 18. The hydrogen absorbing metal containers 2a and 2b of the hydrogen utilization unit 2B are connected in the same manner as their counterparts in the 2A, except that the heat exchangers 5a and 5b in the hydrogen absorbing metals 6a and 6b, respectively, in the hydrogen utilization unit 2B are thermally connected to a cooling load 22 such as a refrigeration system and a heat radiator 23 e.g. water cooled radiator in different modes, via four switching valves 16.

The hydrogen supply unit 1 is provided with four pressure sensors 25, 26, 27, and 28, connected to the hydrogen supply tube 7 and the hydrogen recovery tube 8, with the sensor 25 between the hydrogen absorbing metal container 1a and the three-way switching valve 9a, the sensor 26 between the hydrogen absorbing metal container 1b and the three way switching valve 9b, the sensor 27 between the valve 9c and the tank 17, and the sensor 28 between the valve 9d and the tank 18, as shown in FIG. 2. The hydrogen utilization units 2A and 2B are each provided with thermometers (not shown) for measuring the temperatures of respective heat transport media in the heat exchangers 5a and 5b.

The preferred embodiment herein shown employs only one hydrogen supply unit and two hydrogen utilization units. However, it should be understood that the invention envisions more than one hydrogen supply unit and more than two hydrogen utilization units in a heat transfer system.

In the preferred embodiment, the hydrogen tank 17 is filled with pressurized hydrogen gas of, for example, 10 atom, while the hydrogen tank 18 is filled with hydrogen gas of, for example, 1 atm.

Suppose now that the high-temperature heat source 11 and the low-temperature heat source 12 are connected to the heat exchangers 3a and 3b, respectively, of the hydrogen supply unit 1 by appropriately selected heat transport paths via the three-way switching valves 13, with the valves 9c and 9d closed. This connection causes the hydrogen absorbing metal 4a in the container 1a to be heated while liberating hydrogen and causes the hydrogen absorbing metal 4b in the container 1b to be cooled while absorbing hydrogen. Consequently, the pressure in the hydrogen absorbing metal container 1a becomes higher than its original pressure of 10 atm and eventually it reaches a predetermined pressure of for example 11 atm, which is higher than the pressure in the tank 17. On the other hand, the pressure in the hydrogen absorbing metal container 1b lowers below the original pressure in the hydrogen recovery tube 8 and the tank 18, and eventually reaches a predetermined low pressure of for example 0.9 atm.

When the pressures reach these predetermined levels as sensed by the pressure sensors 25, 26, 27, and 28, the three-way switching valves 9a and 9b are switched and at the same time the valves 9c and 9d are opened, connecting the hydrogen absorbing metal container 1a to the hydrogen supply tube 7 and the hydrogen absorbing metal container 1b to the hydrogen recovery tube 8, so that the hydrogen gas is transported from the hydrogen absorbing metal container 1a to the tank 17 and from the tank 18 to the hydrogen absorbing metal container 1b.

As the hydrogen is transported in this manner, the pressure in the container 1a decreases and the pressure in the container 1b increases until the pressures in the tanks 17 and 18 come to equilibrium with each other. The equilibrium pressure will be detected by the use of the pressure sensors 25, 26, 27, and 28, when the valves 9c and 9d will be closed and at the same time the three-way switching valves 13 are switched so as to connect the heat exchanger 3a to the low-temperature heat source 12 and the heat exchanger 3b to the high-temperature heat source 11. This results in cooling of the hydrogen absorbing metal 4a in the container 1a and heating of the hydrogen absorbing metal 4b in the container 1b, thereby causing the metals 4a and 4b to absorb and liberate hydrogen, respectively. Thus, pressure will becomes higher in the container 1b than in the hydrogen supply tube 7, while pressure will become lower in the hydrogen absorbing metal container 1a than in the hydrogen recovery tube 8.

When this condition is detected by the pressure sensors 25, 26, 27, and 28, the valves 9c and 9d are opened, and at the same time the three-way switching valves 9a and 9b are switched again so as to transfer hydrogen from the hydrogen absorbing metal container 1b to the hydrogen tank 17 via the hydrogen supply tube 7, and from the tank 18 to the hydrogen absorbing metal container 1a via hydrogen recovery tube 8.

Because of this hydrogen transport, the pressure in the hydrogen absorbing metal container 1b lowers and the pressure in the hydrogen absorbing metal container 1a rises until the pressures in the tanks 17 and 18 reach an equilibrium. After this equilibrium is reached, the valves 9c and 9d are closed again and the three-way switching valves 13 are switched, and at the same time the heat exchangers 3a and 3b connected to the high-temperature heat source 11 and the low-temperature heat source respectively, coming back to the original state and ready to repeat the cycle described above.

Thus, the cycle may be repeated in the hydrogen supply unit 1 to transfer hydrogen from the tank 18 to the tank 17, independently of the operations of the hydrogen utilization units 2A and 2B.

Operation of the hydrogen utilization units 2A and 2B will be now described. The valves 10c and 10d are closed when respective hydrogen utilization units 2A and 2B are not in use. Suppose now that the three-way valves 10a and 10b of the hydrogen utilization units 2A and 2B are appropriately set to connect the containers 2a and 2b to the hydrogen supply tube 7b and hydrogen recovery tube 8b, respectively, but that the valves 10c and 10d of the hydrogen utilization units 2A and 2B are closed. Suppose further that in the hydrogen utilization unit 2A the heat exchanger 5a in the container 2a and the heat exchanger 5b in the container 2b are thermally connected to the heating load 14 and the disposed heat source 15, respectively, via the three-way switiching valves 16, while in the hydrogen utilization unit 2B the heat exchangers 5a and the 5b are thermally connected via the three-way switiching valves 18 to a heat radiator and the cooling load 22, respectively.

When the hydrogen utilization unit 2A is required to supply heat to the heating load 14, the valves 10c and 10d are opened, which causes the hydrogen tank 17 to provide the hydrogen absorbing metal 6a in the hydrogen utilization unit 2A with hydrogen. The three-way valves 16 are set to a first mode to connect the heat exchangers 5a and 5b to the heating load 14 and the disposed heat source 15. Absorbing the hydrogen, the metal 6a generates heat, which is transported to the heating load 14. On the other hand, the hydrogen absorbing metal 6b in the container 2b absorbs thermal energy delivered from the disposed heat source 15 and liberates hydrogen substantially equal in amount to that supplied from the tank 17 to the container 2a. The liberated hydrogen is recovered to the tank 18. As an example, when a rare-earth metal—Ni alloy is used as the hydrogen absorbing metals 6a and 6b, equilibrium temperature of hydrogen at 10 atm is 100° C., so that the hydrogen in the container 2a may be utilized as a heat source for heating rooms and water. The disposed heat source 15 can be air or water released from a factory, for example, in the range of 40°–50° C., which may generate hydrogen at about 1.1 atom in the container 2b. This is a first phase of a hydrogen utilization cycle.

In this first phase of a cycle an overall operation of the unit 2A is that hydrogen tank 17 supplies hydrogen to the metal 6a in the container 2a, and the metal 6a in turn provides heat to the heating load 14, while the disposed heat source 15 provides heat to the metal 6b in the 2b and the metal 6b liberates hydrogen to the tank 18 for recovery.

In this first phase the temperature of the heat exchanger 5a gradually lowers as the absorption of hydrogen by the metal 6a and and dissociation of hydrogen from 6b diminish. When the temperature of the heat exchanger 5a lowers to a predetermined level as measured by a first thermometer (not shown), the three-way switiching valves 16 are switched to start a second temporary phase of the cycle, in which a circulatory heat transfer path is established which connects the heat exchanger 5a, the heating load 14, the heat exchanger 5b, the disposed heat source 15, and the heat exchanger 5a in this order. At the same time the three-way valves 10a and 10b are also switched so as to connect the containers 2a and 2b to the hydrogen recovery tube 8a and hydrogen supply tube 7a, respectively. In this second phase, the tank 17 provides hydrogen to the container 2b, which hydrogen is absorbed by the metal 6b, liberating heat. This phase continues until the temperature of the heat exchanger 5b rises above a predetermined level as measured by a second thermometer (not shown) provided near the heat exchanger 5b. When the second thermometer detects the rise in temperature, three-way switiching valves 16 are switched again, ending the second phase and entering a third phase of the cycle as described below. Duration of the second phase is very short compared with the overall period of the cycle.

In the third phase, the heat exchangers 5b and 5a are connected to the heating load 14 and the disposed heat source 15, respectively. The container 2b is now provided with hydrogen from the hydrogen tank 17, which hydrogen is absorbed by the metal 6b, generating heat to the heating load 14. At the same time heat is provided from the disposed heat source 15 to the metal 6a in the container 2a, causing the metal 6a to liberate hydrogen to the tank 18 for recovery. Hydrogen thus liberated and absorbed by the metal 6a and 6b, respectively, will gradually diminish, just as in the first phase of the cycle, and hence absorption and generation of heat by the metals 6a and 6b will gradually diminish. When the second thermometer detects a predetermined rise in temperature of the heat exchanger 5b, the three-way switiching valves 16 are switched so as to end the third phase and start a fourth phase, in which a circulatory heat transfer path is established, connecting the heat exchanger 5b, the heating load 14, the heat exchanger 5a, the disposed heat source 15 in the order described, and connecting the disposed heat source 15 back to the heat exchanger 5a. At the same time the three-way valves 10a and 10b are also switched to allow the containers 2a and 2b to be connected again to the tubes 7a and 8a, respectively. As a result of this switching, hydrogen is supplied from the hydrogen tank 17 to the hydrogen absorbing metal 6a in the container 2a, which in turn liberates heat. This phase continues until the first thermometer detects a predetermined rise in temperature of the heat exchangers 5a, when the switching valves 16 are switched to connect the heat exchanger 5a to the heating load 14 and the heat exchanger 5b to the disposed heat source 15 again. This completes the cycle, bringing the system back to its original condition.

Briefly restated, during provision of heat to the heating load 14 by the hydrogen utilization unit 2A, the hydrogen tank 17 selectively provides hydrogen to one of the containers 2a and 2b, extracting heat from the metal in that container and delivering the heat therefrom to the heating load 14 while recovering the hydrogen liberated from the other one of the containers 2a and 2b to the tank 18. Similarly, in the hydrogen utilization unit 2B, when the system must supply negative heat to the cooling load 22 (i.e. cool the radiator in the unit 22), the valves 10c and 10d are opened. The three-way valves 10a, 10b, and 16 are controlled in response to the signals received from thermometers measuring the temperature of the heat exchangers 5a and 5b, respectively. The tank 17 selectively provides hydrogen to one of the metals in the containers 2a and 2b, while hydrogen is liberated from the other metal, absorbing heat from the heat exchanger in the container, which in turn absorbs heat from the cooling unit 22. As an example, when the hydrogen in the tank 17 has a pressure of 10 atm, the metals 6a and 6b are a rare-earth metal—Ni alloy, and the cooling water has a temperature between 20° and 30° C., the temperature of the hydrogen, and hence the heat exchanger for that gas, would be between 0° and −10° C. if it is liberated at a pressure a little higher than 1 atm.

As described above, the hydrogen supply unit 1 and the hydrogen utilization units 2 may operate in cooperation with the tanks 17 and 18, compensating for a pressure drop in the tank 17. It should be noted that the unit 1 may operate independently of hydrogen utilization units 2. In the hydrogen utilization units 2 hydrogen is always supplied from the tank 17 and recovered to the tank 18 via the hydrogen utilization units 2, repeatedly providing positive heat to the heating load 14 and negative heat to the heat radiator 23. It should be also noted that each of the hydrogen supply unit 1 and the utilization units 2 may be operated independently, i.e. without being synchronized with each other, by means of a simple control system such as three-way valves, thermometers, pressure gauges, and a controller(not shown). This is a great benefit obtained by the invention.

Although tanks 17 and 18 are assumed to be sufficiently large in the foregoing example, they may be eliminated if the hydrogen supply tube and the hydrogen recovery tube have sufficiently large capacities.

Also, a preferred example is shown for a case in which hydrogen utilization units are controlled based on the temperatures of the heat transport media as measured by the thermometers provided for the heat exchangers. However, the invention may be alternatively controlled by measuring the pressure difference between the containers and the hydrogen transport tubes.

Such pressure-based control may be carried out as follows. Suppose, for example, that in the hydrogen utilization unit 2A the heating load 14 and the disposed heat source 15 are connected to the heat exchangers 5a of containers 2a and the heat exchangers 5b of the containers 2b, respectively, via three-way switching valves 16 and that the containers 2a and 2b are connected to the hydrogen supply tube 7a and the hydrogen recovery tube 8a, respectively, further that the valves 10c and 10d are closed. In this mode of connection, when heat is to be supplied to the heating load 14, the valves 10c and 10d are opened, allowing the tank 17 to supply hydrogen to the hydrogen absorbing metal 6a in the container 2a. Then the heat is generated by the hydrogen absorbing metal 6a, which heat is transported by the heat transport path connected to the heating load 14. At the same time heat is transported to the heat exchanger 5b of the container 2b from the disposed heat source 15 via the three-way switching valves 16, liberating hydrogen from the metal 6b to the tank 18 via the three-way valves 10b and the hydrogen recovery tube 8a.

As the absorption and the dissociation of the hydrogen by the metals 6a and 6b, respectively, gradually lowers and the pressures in the containers 2a and 2b approach the pressures in the hydrogen tanks 17 and 18, respectively. The pressure differences between the container 2a and the hydrogen tank 17 and between the container 2b and the tank 18 may be measured by a set of pressure gauges connected between the containers 2a and 2b and the three-way valves 10a and another set of pressure gauges connected between the three-way valves 10b and 10c and the tanks 17 and 18. When the pressure differences fall within predetermined ranges, the three-way valves 10a and 10b as well as the three-way switiching valves 16 are switched to connect the containers 2b and 2a to the hydrogen tanks 17 and 18, respectively. This connection establishes a circulatory heat transfer path which connects the heat exchanger 5a of the container 2a, the heating load 14, the heat exchangers 5b, the heating load 14, and the disposed heat source 15, in the order described. Thereafter, the heat exchanger 5a is connected to the disposed heat source 15, and the heat exchanger 5b to the heat load 14.

Thus, the hydrogen utilization unit 2A may be repeatedly operated as an independent unit for generating heat to the heating load 14 by monitoring the pressures in the containers 2a and 2b as well as in the hydrogen tanks 17 and 18, while flowing hydrogen from the tank 17 to the tank 18.

It should be clear that the hydrogen utilization unit 2B may be operated in the same way as the unit 2A, but now functioning as an independent unit for removing heat from the cooling load 22 by monitoring the hydrogen pressures in the containers 2a and 2b of the unit 2B and in the hydrogen tanks 17 and 18.

We claim:

1. A heat transfer system, comprising:
   at least one hydrogen supply unit for supplying hydrogen;
   a multiplicity of hydrogen utilization units; and
   first and second hydrogen transport tubes having capacities sufficient for accumulating amounts of hydrogen and connecting said at least one hydrogen supply unit to said hydrogen utilization units,
   said at least one hydrogen supply unit comprising:
      first and second hydrogen absorbing metal containers containing therein first and second hydrogen absorbing metals, respectively, and first and second heat exchangers, respectively;
      a first set of cross-over tubes interconnecting said first and second hydrogen transport tubes for selectively transferring hydrogen flow therebetween,
      a first multiplicity of switching valves associated with said first set of cross-over tubes for selectively connecting said first and said second containers to said first and second hydrogen transport tubes in different combinations in accordance with the pressure difference between the pressure in said first and/or said second containers and the pressure in said first and/or said second hydrogen transport tubes;
      a first set of control valves in said first and second hydrogen transport tubes for controlling the flow of hydrogen between said first and said second containers and said first and said second hydrogen transport tubes in accordance with said pressure difference;
      a first set of heat transport paths including cross-over paths for connecting said first and said second heat exchangers in said respective containers to a source of heat and a heat radiator;

a second multiplicity of switching valves in said heat transport paths for switching said heat transport paths from one mode to another in accordance with the conditions of said first set of said control valves, and said hydrogen utilization unit comprising:

third and fourth containers communicating with said hydrogen transport tubes for accommodating third and fourth hydrogen absorbing metals, respectively, and third and fourth heat exchangers, respectively;

a second set of cross-over tubes for interconnecting said hydrogen transport tubes for selectively transferring hydrogen flow therebetween:

a third multiplicity of switching valves operative with said second set of cross-over tubes for selectively connecting said third and fourth containers to said first and second hydrogen transport tubes in accordance with the temperature difference between the temperature in said third and-/or said fourth containers and the temperature in said first and/or said second hydrogen transport tubes:

a second set of heat transport paths including cross-over paths for connecting said third and said fourth heat exchangers in said respective containers to a heating load and a source of disposed heat in the case where said hydrogen utilization unit is used to provide positive heat, and connected to a cooling load and a heat radiator in the case where said unit is used to provide negative heat;

a fourth multiplicity of switching valves associated with said second set of heat transport paths for switching said heat transport paths from one mode to another in accordance with the temperature difference between the temperature in said third and/or said fourth heat exchangers and the temperature of said heating/cooling load; and a second set of control valves in said first and second hydrogen transport tubes for controlling the flow of hydrogen between said third and said fourth containers and said first and said second hydrogen transport tubes in accordance with a heat requirement of said loads.

2. A heat transfer system as claimed in claim 1, in which said at least one hydrogen supply unit further comprises first and second tanks connected to said first and second hydrogen transport tubes, respectively, and operative to maintain amounts of hydrogen at substantially constant predetermined pressures.

3. A heat transfer system as claimed in claim 1, wherein said first hydrogen transport tube is a tube for conducting hydrogen for supplying hydrogen at an elevated pressure to said hydrogen utilization units and said second hydrogen transport tube is a tube for conducting hydrogen in a return direction from said hydrogen utilization unit for recovering relatively low pressure hydrogen.

4. A heat transfer system as claimed in claim 3, including:

means for setting said first multiplicity of switching valves to connect one of the containers in flow-conducting relation with respect to the first tube and the other container in flow-conducting relation with respect to the second tube under the condition that at least the pressure in said one container is higher than the high pressure in the first tube, and further including:

means for opening said first set of control valves between the first and the second containers and the first and the second tubes in response to a condition that the pressure in at least one of the containers is higher than the pressure in said first tube by a predetermined amount, and for closing said first set of control valves when the pressure difference between said containers and said tubes becomes smaller than said predetermined amount.

5. A heat transfer system as claimed in claim 3 including:

means for setting said first multiciplicity of switching valves to connect one of the containers in flow-conducting relation with respect to the first tube and the other container in flow conducting relation with respect to the second tube under the condition that at least the pressure in said one container is lower than the pressure in the second tube, and further including:

means for operating said first set of control valves between the first and the second containers and the first and the second tubes may be opened in response to a condition that the pressure in at least one of the containers is lower than the pressure in said second tube by a predetermined amount, and for closing said first set of control valves when the pressure difference between said containers and said tubes becomes smaller than said predetermined amount.

6. A heat transfer system as claimed in claim 3, including:

means for setting said third multiplicity of switching valves to transfer hydrogen flow to one of the third and fourth containers, which is connected to the first tube, from said first tube to said second tube in response to the temperature of the heat exchanger in that container being lowered below a predetermined high temperature level when the hydrogen utilization unit is in use for a heating load;

means for setting said fourth multiplicity of switching valves to connect said one heat exchanger to the heating load and said other heat exchanger to said disposed heat source in response to a rise in temperature of one heat exchanger to said first predetermined level; and means for selectively opening and closing said second set of control valves connecting said third and fourth containers to said first and second tube in response to a demand for heat by said heating load.

7. A heat transfer system as claimed in claim 3, including:

means for setting said third multiplicity of switching valves to transfer hydrogen flow from one of said third and fourth containers, which is connected to said first tube, from its connection to said first tube to the connection to said second tube in response to a rise in the temperature of said heat exchanger in that container above a second predetermined low temperature level when the hydrogen utilization unit is in use for a cooling load;

means for setting said fourth multiplicity of switching valves to connect said one heat exchanger to said cooling load and said other heat exchanger to said heat radiator after the temperature of said one heat exchanger has lowered below said predetermined low temperature level; and means for selectively opening and closing the second set of control valves connecting said third and fourth containers to said first and second tubes in response to a demand for negative heat to a cooling load.

8. A heat transfer system, comprising:

at least one hydrogen supply unit for supplying hydrogen;

a multiplicity of hydrogen utilization units; and first and second hydrogen transport tubes having capacities sufficient for accumulating amounts of hydrogen and connecting said at least one hydrogen supply unit to said hydrogen utilization units;

said at least one hydrogen supply unit comprising:
  first and second hydrogen absorbing metal containers containing therein first and second hydrogen absorbing metals, respectively, and first and second heat exchangers respectively;
  a first set of cross-over tubes interconnecting said first and second hydrogen transport tubes for selectively transferring hydrogen flow therebetween;
  a first multiplicity of switching valves associated with said first set of cross-over tubes for selectively connecting said first and said second containers to said first and second hydrogen transport tubes in different combinations in accordance with the pressure difference between the pressure in said first and/or said second containers and the pressure in said first and/or said second hydrogen transport tubes;
  a first set of control valves in said first and second hydrogen transport tubes for controlling the flow of hydrogen between said first and said second containers and said first and said second hydrogen transport tubes in accordance with said pressure difference;
  a first set of heat transport paths including cross-over paths for connecting said first and said second heat exchangers in said respective containers to a source of heat and a heat radiator;
  a second multiplicity of switching valves in said heat transport paths for switching said heat transport paths form one mode to another in accordance with the conditions of said first set of said control valves; and said hydrogen utilization unit comprising:
  third and fourth containers communicating with said hydrogen transport tubes for accommodating third and fourth hydrogen absorbing metals, respectively, and third and fourth heat exchangers, respectively;
  a second set of cross-over tubes for interconnecting said hydrogen transport tubes for selectively transferring hydrogen flow therebetween;
  a third multiplicity of switching valves operative with said second set of cross-over tubes for selectively connecting said third and fourth containers to said first and second hydrogen transport tubes in accordance with the pressure difference between the pressure in said third and/or fourth container(s) and the pressure in said first and/or second hydrogen transport tube(s);
  a second set of heat transport paths including cross-over paths for connecting said third and said fourth heat exchangers in said respective containers to a heating load and a source of disposed heat in the case where said hydrogen utilization unit is used to provide positive heat, and connected to a cooling load and a heat radiator in the case where said unit is used to provide negative heat;
  a fourth multiplicity of switching valves associated with said second set of heat transport paths for switching said heat transport paths from one mode to another in accordance with the switching of said third multiplicity of switching valves; and
  a second set of control valves in said first and second hydrogen transport tubes for controlling the flow of hydrogen between said third and fourth containers and the first and second hydrogen transport tubes in accordance with the heat requirements of said load.

9. A heat transfer system as claimed in claim 8, in which said at least one hydrogen supply unit further comprises first and second tanks connected to said first and second hydrogen transport tubes, respectively, and operative to maintain amounts of hydrogen at substantially constant predetermined pressures.

10. A heat transfer system as claimed in claim 8, wherein said first hydrogen transport tube is a tube for conducting hydrogen for supplying hydrogen at an elevated pressure to said hydrogen utilization units and said second hydrogen transport tube is a tube for conducting hydrogen in a return direction and from said hydrogen utilization unit recovering relatively low pressure hydrogen.

11. A heat transfer system as claimed in claim 10, including:
  means for setting said first multiplicity of switching valves to connect one of the containers in flow-conducting relation with respect to the first tube and the other container in flow-conducting relation with respect to the second tube under the condition that at least the pressure in said one container is lower than the pressure in the second tube, and further including:
  means for opening said first set of control valves between said first and second containers and said first and second tubes in response to a condition that the pressure in at least one of said containers is lower than the pressure in said second tube by a predetermined amount, and for closing said first set of control valves when the pressure difference between said containers and said tubes becomes smaller than said predetermined amount.

12. A heat transfer system as claimed in claim 10, wherein
  said first multiplicity of switching valves may be set to connect one of the containers to the first tube and the other container to the second tube under the condition that at least the pressure in said one container is lower than the pressure in the second tube, and wherein
  said first set of control valves between said first and second containers and said first and second tubes may be opened under the condition that the pressure in at least one of said containers is lower than the pressure in said second tube by a predetermined amount, and closed when the pressure difference between them becomes smaller than said predetermined amount.

13. A heat transfer system as claimed in claim 10, including:

means for setting said third multiplicity of switching valves to transfer hydrogen flow to one of said third and fourth containers, which is connected to said first hydrogen transport tube, from said first tube to said second tube in response to a reduction in the hydrogen pressure in said one container to below a predetermined pressure level when said hydrogen utilization unit is in use for said heating load;

means for setting said fourth multiplicity of switching valves to connect said one heat exchanger to said heating load and said other heat exchanger to said disposed heat source after operation of said third multiple valves to transfer hydrogen flow; and means for selectively opening and closing said second set of control valves connecting said third and fourth containers to said first and said second tubes in response to a demand for heat by said heating load.

14. A heat transfer system as claimed in claim 10, including:

means for setting said third multiplicity of switching valves to transfer hydrogen flow from one of said third and fourth containers, which is connected to said first hydrogen transport tube, from said first tube to said second tube in response to a rise in hydrogen pressure in said one container to a predetermined pressure level when said hydrogen utilization unit is in use for said heating load;

means for setting said fourth multiplicity of switching valves to connect said one heat exchanger to said heat radiator and said other heat exchanger to said cooling load after operation of said third multiple valves to transfer hydrogen flow; and means for selectively opening and closing said second set of control valves to connect said third and fourth containers to said first and second tubes in response to a demand for heat by said heating load.

* * * * *